Patented Aug. 27, 1935

2,012,812

UNITED STATES PATENT OFFICE 2,012,812

CONTINUOUS PROCESS OF PRODUCING ESTERS FROM AQUEOUS SOLUTIONS OF ALIPHATIC ACIDS

Henri Martin Guinot, Melle, France, assignor to Commercial Solvents Corporation, New York, N. Y., a company of Maryland No Drawing. Application May 15, 1931, Serial No. 537,749. In France May 16, 1930

3 Claims. (Cl. 260—106)

As a rule esters are obtained by causing an alcohol to act, in a continuous or discontinuous way, upon an acid. It is known that, in order to obtain a substantially quantitative esterification process, it is necessary to continuously eliminate by distillation the water formed during the reaction. Consequently, it is generally endeavored to employ anhydrous materials or at least materials that are as concentrated as possible, so as not to increase in an excessive manner by an addition of external water, the quantity of heat that is required for the operation.

However, it has already been proposed to produce esters from weak acid dilute solutions, water being eliminated in the form of vinasse or spent wash, instead of being distilled. But these methods have but a restricted field of application because they can be applied only to the production of esters from alcohols and acids capable of esterifying very quickly, such for instance as methyl formates and acetates and ethyl formates and acetates (see for instance German Patent 354,863 and French Patent 544,288). Furthermore, these methods have the disadvantage that they necessitate the use of large quantities of a catalytic mineral acid and do not ensure complete extraction of the acid from the solutions that are utilized.

My invention makes it possible to utilize dilute aqueous solutions of fatty acids for the obtainment of all the aliphatic esters, whatever they may be. My invention is characterized by the combination of two operations, the first of which is well known per se.

1. Extraction of the dilute acid by means of a solvent or of a mixture of suitably chosen solvents, and by any method whatever among those already known;

2. Direct treatment of the acid-solvent mixture thus obtained, which mixture always contains still a small amount of water, so as to esterify the acid contained therein.

This esterification can be performed according to the principles of the methods already known. However, it may more advantageously be effected in accordance with the examples which will be hereinafter described, and which form a part of my invention.

The solvents that can be utilized must meet the following requirements:

(a) They must be insoluble or very little soluble in water;

(b) They must have a good capacity of extracting the acid;

(c) They must not prevent the separation of the products that will be formed during the subsequent esterification;

(d) They must not form with the acid in the heated state any decomposition product which might deteriorate the apparatus or contaminate the ester formed.

I have found that these conditions were fulfilled in a perfect manner when utilizing as a solvent either the alcohol that is to be esterified, which, owing to its chemical affinity for the acid, has a particularly favorable capacity of extraction, or the ester that it is desired to obtain, or else a mixture of the alcohol and of the ester. However my invention is not limited to the use of these bodies. I may also use another ester, either alone or mixed with another body, or else bodies having any chemical function whatever, such as hydrocarbons, ketones, and so on, provided that they meet the above mentioned requirements.

For carrying out my process, three cases are to be considered.

First case. The ester to be obtained corresponds to an alcohol that is insoluble or is little soluble in water.

In that case, it is advantageous to use as a solvent for the acid, the alcohol that is to be esterified, the power of extraction of said alcohol being always very much higher than that of the corresponding ester.

It should be noted that Goering (German Patent No. 28,064 filed Dec. 18, 1883) has cited amyl alcohol as one of the solvents capable of being used for concentrating acetic acid. As a matter of fact, that method is not applicable, because, during the distillation to which is subjected the extract in order to separate acid and alcohol from each other, there takes place a partial esterification which is contrary to the purpose of the method, said purpose being to produce concentrated acid and not ester.

In the present invention, on the contrary, it will not be endeavored to separate the acid from the alcohol, but the mixture will be directly esterified.

The dilute acid solution is first subjected to a methodic exhausting process, by means of alcohol, in the heated or in the cold state, in any suitable apparatus working in a continuous manner. The aqueous residue is discharged after being subjected to a distillation for recovering the small amount of alcohol contained therein. The solution of acid in alcohol is introduced in a continuous manner into a plate column where complete esterification of the acid is obtained by distillation by operating in an anhydrous medium and in the presence of a large excess of alcohol. The ester is subsequently separated from the alcohol in a continuous manner by means of known methods, by utilizing, if need be the properties of azeotropic mixtures, which make it possible to isolate the ester in a pure state. The alcohol that is spent is continuously replaced by an equivalent amount of fresh product, which is returned with the alcohol that is not transformed, so as to indefinitely be used again for the extraction.

*Example 1.—Production of butyl acetate from a 10% acetic acid solution*

100 volumes of a diluted acetic solution are subjected to a methodic exhausting, for instance in a series of apparatus working in a continuous manner, with 150 volumes of butyl alcohol. Owing to the high coefficient of extraction of butyl alcohol with respect to acetic acid, (1 to 1.2), complete exhaustion of the solutions is easily obtained. The extract issuing from the apparatus contains 6.7% of acid and a small amount of water which is easily eliminated during the subsequent distillation together with the esterification water.

The solution of acid in alcohol is introduced into a plate column in which the acid is completely and quickly esterified owing to the presence of a large excess of alcohol, and to the immediate and continuous elimination of water either in the form of a ternary azeotropic mixture boiling at 89.5° (23.7% of water) or in the form of an alcohol-water binary mixture boiling at 92° (35% of water).

The ester is separated in the pure state, by a known method, from the alcohol in excess, which is returned indefinitely to the extraction apparatus. It suffices to replace the alcohol that is spent by fresh alcohol.

*Example 2.—Preparation of butyl lactate from an 8% lactic acid solution*

I make use of butyl alcohol as a solvent in the ratio of 200 volumes of butyl alcohol for 100 volumes of diluted acid. The extract contains about 4% of lactic acid. It is treated in exactly the same manner as described concerning Example 1. Owing to the considerable difference between the boiling points of butyl alcohol (116°) and butyl lactate (190–200°), the separation can be effected without difficulty, the lactate remaining as a residue.

Second case. The ester corresponds to an alcohol soluble in water.

In that case, the extraction of the acid by the alcohol being not possible, I utilize as a solvent the ester to be obtained. Said ester always has a boiling point lower than that of the acid to be extracted, so that, during the separation of the ester from the acid obtained by distillation on the plates of a column, alcohol is fed in a continuous manner, and being in presence of an excess of acid, said alcohol esterifies rapidly. It suffices to remove from the circuit in a continuous manner the quantity of ester corresponding to the acid extracted. As for the small amount of water introduced by the feed mixture, it is driven off during the distillation in the form of an azeotropic mixture simultaneously with the esterification water itself.

*Example 3.—Preparation of ethyl acetate from acetic solutions at 15% obtained during the manufacture of cellulose acetate.*

The diluted acetic solution is methodically exhausted in a continuous manner by means of a volume of ethyl acetate which is equal to twice that of the solution. The extract leaving the apparatus contains 7.5% of acetic acid. That mixture is introduced in a continuous manner into a plate column into which is introduced ethyl alcohol. The presence of an excess of acid with respect to the amount of alcohol that is added and the continuous elimination of water by ethyl acetate in the form of an azeotropic mixture boiling at 70.45°, and containing 8.2% of water produce a rapid esterification of the alcohol. The ester is easily separated. I remove continuously in the pure state the amount of ethyl acetate that corresponds to the acid contained in the extract, that is about 11 kilograms for 100 kilograms of extract submitted to the esterification process. The remaining ester, corresponding to the amount originally used for the extraction, is utilized for the succeeding extraction. In this manner the original amount of ester is continuously recycled in the process, it being necessary to add fresh material only to replace mechanical losses or evaporation losses.

*Example 4.—Production of ethyl butyrate*

The starting solution is an aqueous solution of butyric acid at 18%, corresponding to a mixture having a minimum boiling point. As ethyl alcohol is soluble, the extraction of butyric acid is obtained by means of ethyl butyrate itself (0.5 vol.). The extract issuing from the apparatus, which contains 36% of butyric acid, is treated in a column into which is introduced in a continuous manner ethyl alcohol. The operation is quite analogous to that described in Example 3. The ethyl butyrate, which boils at 120°, is obtained in a very pure state.

Third case. It may happen that the ester to be prepared is itself soluble in the acid solution to be extracted. In that case, I add to said ester, in order to effect extraction, another ester or a supplementary solvent insoluble or little soluble in water, and chosen in such manner that it may subsequently be easily separated from either the ester obtained, or the acid itself.

*Example 5*

In order to prepare methyl acetate (boiling point 57) I may use as a supplementary solvent isopropyl acetate the boiling point of which (88°) allows an easy separation from acetic acid (boiling point 118) and methyl acetate.

The isopropyl acetate will also serve to entrain water during the distillation. For it forms with water a mixture having a minimum boiling point which boils at 60° and contains 10% of water.

In order to carry out the process according to my invention I may use any of the known extracting apparatus operating either in the cold or in the hot state (column with a filling material, battery of apparatus with decanters).

Finally I may point out an interesting application of the present invention, when it is desired to perform esterification as an accessory operation in the general manufacture of a concentrated acetic acid.

There are industrial plants for concentrating fatty acids by a method employing esters as solvents or as entraining bodies. It is for instance the case of the concentration of vinegar for obtaining anhydrous acetic acid which is to be used for the manufacture of cellulose acetate artificial silk. It may be interesting to add to this process of manufacture a supplementary production of esters. By applying the principle of the present invention I make it possible to avoid the necessity of a special apparatus for esterification. I introduce into the closed circuit in which the solvent or the entraining body flows, in a continuous or in a discontinuous manner, a certain quantity of alcohol corresponding to the amount of ester to be produced. The esterification process will take place by itself in the part of the apparatus in which the acid is separated by distillation from the solvent or from the entraining body. It will suffice to remove the ester that will be formed at a point of the circuit suitably chosen according to the methods that are used.

It will be possible, without departing from the principle of my invention to use any of the known esterification processes or to make some modifications of detail in the process above described, for instance to work, wholly or partly, at a pressure different from atmospheric pressure, provided that said modifications come within the scope of the appended claims.

What I claim is:

1. A method of producing esters from diluted aqueous solutions of aliphatic monocarboxylic acids which comprises the step of first extracting the acid from its solution by means of a substantially water immiscible solvent selected from the group consisting of an aliphatic primary monohydric alcohol that is to be esterified by said acid and an ester that is to be produced from said acid, removing the aqueous residue and thereafter directly fractionally distilling said extract in the presence of such alcohol to directly esterify the acid contained in the said extract, removing the water of reaction whereby the distilling mixture is maintained in a substantially anhydrous state and finally separating the resulting ester from the distillation residue.

2. A method of producing esters from dilute aqueous solutions of aliphatic monocarboxylic acids which comprises the step of first extracting the acid from its solution by means of a substantially water-immiscible aliphatic primary monohydric alcohol that is to be esterified by said acid, separating the resulting extract from the aqueous residue and thereafter directly fractionally distilling said extract while maintaining the concentration of alcohol in excess of the concentration of acid in said extract, and removing the water of reaction whereby the mixture is maintained in a substantially anhydrous state, thereby directly esterifying the acid contained in said extract.

3. A method of producing esters from dilute aqueous solutions of aliphatic monocarboxylic acids which comprises the step of first extracting the acid from its solution by means of a substantially water-immiscible aliphatic alcohol ester that is to be produced from said acid, separating the resulting extract from the aqueous residue and thereafter directly fractionally distilling said extract in the presence of the alcohol to be esterified while maintaining the concentration of the acid present in said extract in excess of the concentration of said alcohol, and removing the water of reaction whereby the mixture is maintained in a substantially anhydrous state, thereby directly esterifying the acid contained in said extract.

HENRI MARTIN GUINOT.